United States Patent [19]

DiGiovanni et al.

[11] Patent Number: 5,572,618
[45] Date of Patent: Nov. 5, 1996

[54] OPTICAL ATTENUATOR

[75] Inventors: David J. DiGiovanni, Montclair; Katherine T. Nelson, Gillette; Jay R. Simpson, Fanwood; Kenneth L. Walker, New Providence, all of N.J.

[73] Assignee: Lucent Technologies Inc., Murray Hill, N.J.

[21] Appl. No.: 274,597

[22] Filed: Jul. 13, 1994

[51] Int. Cl.[6] ............................................. G02B 6/00
[52] U.S. Cl. ............................................. 385/140; 65/406
[58] Field of Search ............................ 385/141, 147, 385/142; 65/3.11

[56] References Cited

U.S. PATENT DOCUMENTS

| | | | |
|---|---|---|---|
| 3,859,073 | 1/1975 | Schultz | 65/60 |
| 3,933,454 | 1/1976 | DeLuca | 385/141 |
| 4,009,014 | 2/1977 | Black et al. | 65/3 |
| 4,327,965 | 5/1982 | Black | 385/141 |
| 4,367,013 | 1/1983 | Guerder et al. | 385/141 |
| 4,629,485 | 12/1986 | Berkey | 65/3.11 |
| 4,787,927 | 11/1988 | Mears et al. | 65/3.12 |
| 4,998,795 | 3/1991 | Bowen et al. | |
| 5,095,519 | 3/1992 | Dorsey | |
| 5,121,460 | 6/1992 | Tumminelli et al. | 385/126 |
| 5,146,534 | 9/1992 | Lines | 385/142 |

FOREIGN PATENT DOCUMENTS

| | | |
|---|---|---|
| 0294037A1 | 12/1988 | European Pat. Off. . |
| 0585088A2 | 3/1994 | European Pat. Off. . |

OTHER PUBLICATIONS

"Optical Absorption of the Transition Elements in Vitreous Silica"—Peter C. Schultz (pp. 309–313).

Primary Examiner—Akm E. Ullah

[57] ABSTRACT

A passive optical attenuating device comprises an optical waveguide adapted to receive optical radiation and absorb, along its length, at least 0.2 dB/m of the optical radiation. The waveguide section may be coupled to a low-loss optical fiber so as to receive an optical signal to be attenuated therefrom. In accordance with one aspect of the invention, at least one region of the waveguide is doped with a transition metal to achieve a pre-selected absorptivity per unit length so that a controlled degree of attenuation can be achieved.

21 Claims, 2 Drawing Sheets

5,572,618

OPTICAL ATTENUATOR

BACKGROUND OF THE INVENTION

1. Field of the Invention

The present invention relates generally to the transmission of optical fiber signal communications and, more particularly, to an optical attenuator which employs a high-loss optical waveguide section.

2. Description of the Prior Art

The advantages of using optical transmission systems for communications are well recognized. Optical waveguides comprising dielectric fibers having a substantially transparent core coaxially surrounded by a cladding material of lower dielectric index may be used to guide and transmit optical signals over long distances in optical communications systems. Generally, great care is taken to minimize light losses due to absorption and scattering along the length of the filament, so that light applied to one end of the optical filamentary material is efficiently transmitted to the opposite end of the material. For this reason, low attenuation optical waveguides are commonly formed from fibers doped with rare earth elements. There are many situations, however, in which it is necessary to utilize optical attenuator devices to reduce the amount of power present in the optical signal.

Two output characteristics are usually described for an optical transmission system: the transmission rate, e.g. in Mbit/s as a measure of the amount of transmitted data, and the system range, which indicates the maximum attenuation that may be placed between emitter and receiver in order to assume a certain minimum quality of transmission. However, further information is needed for practical use. A receiver is only able to function optimally within a certain range of the optical input level. Too low a radiation capacity, as well as too high a level, can impair the transmission quality. The path attenuation in optical transmission systems is a function of fiber length and the fiber attenuation coefficient. In addition, emitter output and receiver sensitivity have tolerances and may exhibit aging. For these reasons, an attenuation device for adapting the path attenuation to the receiver's optimum function range is needed.

For example, disclosed in U.S. Pat. No. 5,187,610 entitled LOW NOISE, OPTICAL AMPLIFIER HAVING POST-AMPLIFICATION LOSS, issued to Habbab, et. al. and assigned to the assignee herein, AT&T, is a technique for improving the noise performance of an optical amplifier while concurrently meeting the amplifier design criteria for output signal power, amplifier gain, and compression. These benefits are obtained by combining an optical amplifier element with a post-amplification optical attenuator/loss element and pumping the optical amplifier to produce a higher gain and, therefore, a larger output signal power which is substantially compensated by the post-amplifier loss element. Compensation by the loss element allows the combination of elements to produce an output signal power which meets the design criterion.

Habbab et al. provide several examples of conventional passive optical attenuation devices capable of serving as the means for introducing a post-amplifier loss in the inventive system. The loss introducing techniques suggested in that patent include the use of a fiber-to-fiber coupler having an intentional misalignment between the two fibers to cause the desired amount of loss or providing curvature or bending of an optical fiber or dielectric waveguide to subject the lightwave signal to controllable amounts of loss as a function of the radius of the curve or bend. In each of these loss introducing techniques, precise adjustments to the fiber gap or curvature are necessary in order to achieve the requisite amount of attenuation.

Fiber optic attenuating devices are also employed as terminations for the ends of unused optical fibers of devices such as star couplers to eliminate deleterious reflections. As will be readily understood by those skilled in the art, an optical star coupler is a device which comprises a plurality of input optical fibers, a coupling region, and a plurality of output optical fibers. An optical star coupler typically operates to transmit a fraction of the optical power received at each input fiber to all output fibers and is particularly useful for implementing an optical bus which enables a plurality of terminals to communicate with one another.

A typical, off-the-shelf star coupler is an 8×8 device, i.e., it comprises eight input fibers and eight output fibers. However, in a typical application not all of the input fibers receive optical signals and not all of the output fibers are connected to other fibers for transmitting optical signals to remote locations. For example, to provide a 4×4 coupler, four of the eight input fibers are not utilized and four of the eight output fibers are not utilized. These unused fibers conveying output signals give rise to undesired reflections that result from the fiber-air index of refraction mismatch at the ends of the unused fibers. Typically, the index of refraction mismatch at a glass fiber-air interface results in a reflection of four percent of the optical signal.

Thus, in a 4×4 coupler formed by an 8×8 star coupler having four unused input fibers and four unused output fibers, the optical signal arriving on each of the used or connected input fibers is distributed by the coupling region to all eight output fibers. The radiation distributed to the used output fibers is transmitted via connector assemblies to other fibers for transmission to remote locations. At the ends of the four unused output fibers, reflections take place. The reflected radiation is then distributed by the coupling region to all the input fibers where reflection again takes place at the glass-air interfaces at the ends of the unused input fibers. This reflected radiation is then, in turn, transmitted by the coupling region back to the output fibers, and so on.

Because glass-air interfaces at the ends of unused fibers cause multiple reflections in a device such as an optical coupler, a variety of reflection-less terminating devices have been proposed. For example, in U.S. Pat. No. 4,998,795 entitled "REFLECTION-LESS TERMINATOR" and issued to Bowen et al., a terminator comprising a length of optical fiber is described. The front end of the fiber is attached to a ferrule for mating with a connector plug attached to the end of the fiber to be terminated. The rear end of the fiber is crushed at an angle and inserted into an index matching opaque adhesive material. Because there are substantially no reflections at the fiber-adhesive material interface, substantially all of the radiation propagating in the fiber length is transmitted into the opaque index matching adhesive where this radiation is absorbed. While the device taught by Bowen et al. does appear to achieve a substantially reflection-less termination, its complex structure requires several labor-intensive processing steps and may degrade in performance over time.

In view of the above, it would be advantageous to provide a passive optical signal attenuating element which may be flexibly configured to provide a controlled degree of attenuation such that it may be inserted at any point in an optical path to introduce a desired amount of loss or be utilized to provide a substantially reflection-less termination for an optical fiber.

SUMMARY OF THE INVENTION

A passive optical attenuating device constructed in accordance with the present invention includes a section of a waveguide having a core and cladding. The waveguide section is adapted to receive optical radiation and absorb at least 0.2 dB/m of the optical radiation along its length. In accordance with one aspect of the present invention, the waveguide may be configured to absorb between approximately 1 to 1000 dB/m in a substantially uniform manner along its length. The attenuation remains constant at optical powers of less than 100 mW.

The waveguide may be formed from a fused silica fiber having a region doped with ions of a metal selected from the class consisting of Fe, Ni, Co, Cr, Cu, Ti, Mn, and V, in a concentration effective to provide a predetermined degree of absorption at a given wavelength. In accordance with one embodiment of the present invention, the doped region comprises the core of the fiber. In accordance with another embodiment, the doped region is a ring layer surrounding the core of the fiber.

To facilitate connection to a low-loss, signal carrying waveguide, the optical attenuator of the present invention may also be provided with means for coupling the waveguide section thereto so as to enable optical signals to be received therefrom.

The degree of attenuation provided by the waveguide section of the present invention is governed by the application. If desired, for example, the waveguide may be configured to absorb substantially all input radiation at a given wavelength. Thus, it may be utilized to provide a reflection-less terminating device for the unused, signal carrying fibers of a star coupler or similar device.

A method of fabricating an optical signal transmission system having at least one optical waveguide for defining an optical signal transmission path comprises the steps of providing an optical waveguide section having a core and cladding and defining an absorbing region adapted to receive optical radiation and to absorb at least 0.2 dB/m of the received optical radiation. The radiation is absorbed along the length of the waveguide section to provide attenuation which remains substantially constant below a predetermined optical power. The method further includes a step of coupling a first end of the optical waveguide section to a corresponding termination of the at least one optical waveguide.

Where a single waveguide defines the optical transmission path, a substantially reflection-less, high loss termination can be fabricated utilizing the inventive method of the present invention. Alternatively, a desired degree of attenuation can be provided between two waveguides by coupling each end of the optical waveguide section to a corresponding end of the first and second optical waveguides. In accordance with an illustrative embodiment of the present invention, the at least one optical waveguide and the optical waveguide section are optical fibers and the coupling step comprises fusion bonding the respective optical fibers.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

As indicated above, it is an object of the present invention to provide an attenuating element which may be utilized in a terminating assembly to provide a reflection-less termination for an optical fiber or in a coupling assembly to introduce a controlled degree of attenuation between two sections of fiber defining an optical signal path. For each of these applications, a section of fiber doped with a transition element (e.g., Fe, Ni, Co, Cr, Cu, Ti, Mn, V) is utilized to provide the desired degree of loss/attenuation.

It is, of course, well known that the fabrication of doped fused-silica glasses having extremely low optical losses must be virtually free of transition elements to reach the attenuation levels (<20 dB/km) required for the successful operation of communication systems at wavelengths between about 600 and 1600 nm. An important aspect of the present invention, however, resides in the realization by the inventors hereof that a section of fiber doped with an appropriate concentration of transition metal ions may be utilized to provide a precisely controlled degree of attenuation at the operating wavelength.

Figure 1:
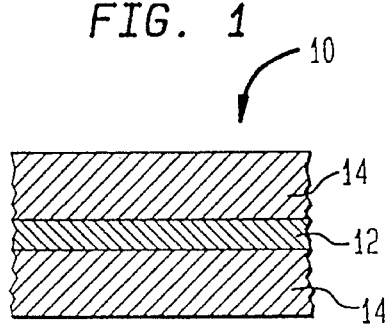
FIG. 1 is a cross sectional view of an attenuating waveguide constructed in accordance with an illustrative embodiment of the present invention.

An illustrative embodiment of an attenuating fiber element 10 having an 8–12 micron core region 12 and 125 micron thick cladding layer 14 is depicted in FIG. 1. In the embodiment of FIG. 1, core region 12 is doped with a refractive index raising element such as Ge and one of the aforementioned transition metals. For purposes of the present invention, it should be understood that techniques for forming doped fused silica glass are well known in the art and a detailed discussion of the same has been omitted. However, for a more detailed explanation of one technique which may be employed, reference may be had to U.S. Pat. No. 4,787,927 issued to Mears et al. and entitled FABRICATION OF OPTICAL FIBERS, the entire disclosure of which is expressly incorporated herein by reference.

In any event, it will be readily appreciated by those skilled in the art that the precise level of attenuation provided by the illustrative fiber section depicted in FIG. 1 will at least in part depend upon the concentration and absorption/loss characteristics of the transition metal selected. In an article by Peter Schultz entitled "Optical Absorption of the Transition Elements in Vitreous Silica", published in 57 Journal of the American Ceramic Society 309–313 (July 1974), practical absorptivity spectra for transition elements in fused silica prepared by flame hydrolysis are provided. Schultz reports that of the transition metals, vanadium is the strongest absorber in the 800 nm to 1000 nm range, with just 19 ppba V in fused silica being required to produce a 20 dB/km loss at 800 nm, while at wavelengths above 1300 nm chromium provides the strongest degree of absorption.

While forming an optical fiber doped with a transition metal is one technique for achieving an attenuating optical element in accordance with the present invention, other techniques may also be utilized to fabricate fibers having the desired absorption properties. For example, satisfactory results have also been achieved utilizing a post-processing technique such as impregnating a Ge-doped fiber with hydrogen. The hydrogen permeates the fiber and is reacted thermally or photolytically with the Ge to provide an absorptive region. An alternate post-processing technique which may be utilized to fabricate a fiber with suitable attenuating characteristics comprises gamma radiating the section of fiber. It should also be noted that hydrogen reaction may also be used to alter the oxidation state of the transition metals and thus vary the degree of absorption. A given fiber may then be tailored to provide a range of attenuation levels.

Figure 2A:
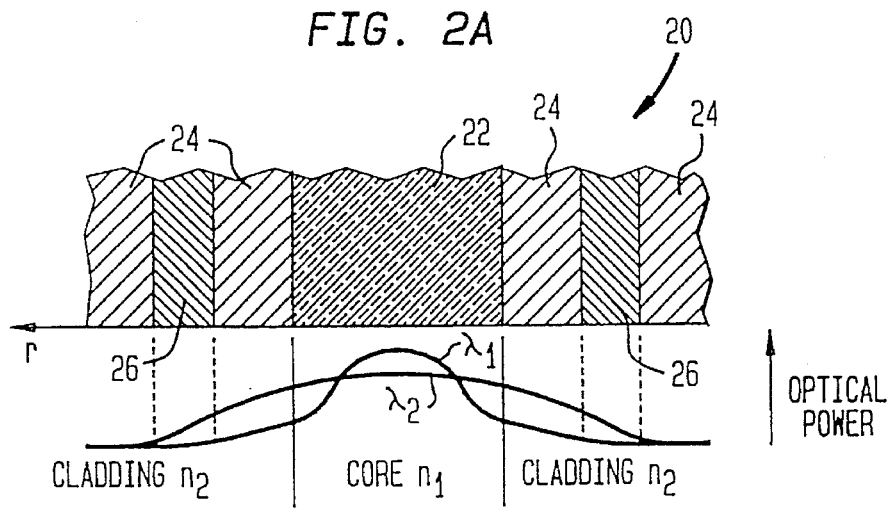
FIG. 2A is a cross sectional view of attenuating waveguide constructed in accordance with an alternate embodiment of the present invention and a graph showing the optical power as a function of the waveguide for two exemplary wavelengths.

In FIG. 2A, there is illustrated an attenuating fiber element constructed in accordance with another embodiment of the present invention. In the embodiment of FIG. 2A, fiber element 20 includes a Ge doped core region 22 and a cladding layer 24 which defines a transition metal doped, absorptive ring layer 26. In accordance with this alternate embodiment, an optical signal having a short wavelength, $\lambda_1$ avoids passage through the ring layer 26 and thus experiences low loss. In contrast, an optical signal having a long wavelength $\lambda_2$ passes through ring layer 26 and thus experiences a high loss.

Figure 2B:
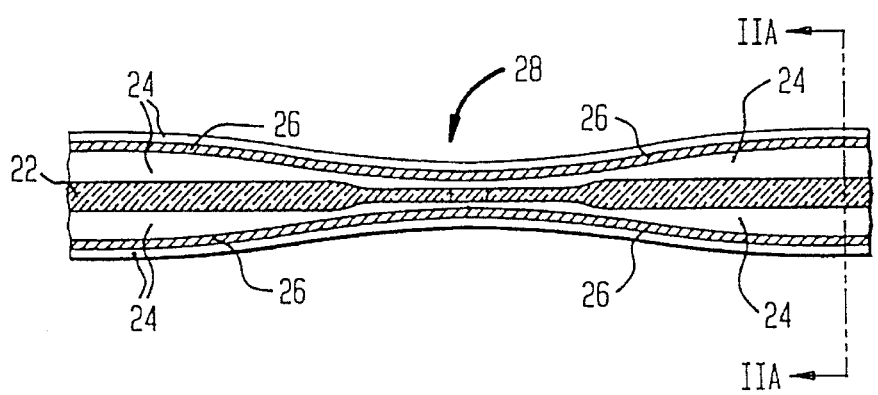
FIG. 2B is a cross sectional view depicting the use of a tapered region in the embodiment of FIG. 2A.

As seen in FIG. 2B, by providing fiber section 20 with a tapered region 28, it is also possible to cause signals at lower wavelengths to be attenuated by ring layer 26. Note that prior to tapered region 28, the mode field does not overlap the ring layer 26. At the taper the mode field expands, overlapping into the ring layer 26 to produce a lossy region at the taper 28.

Figure 3:
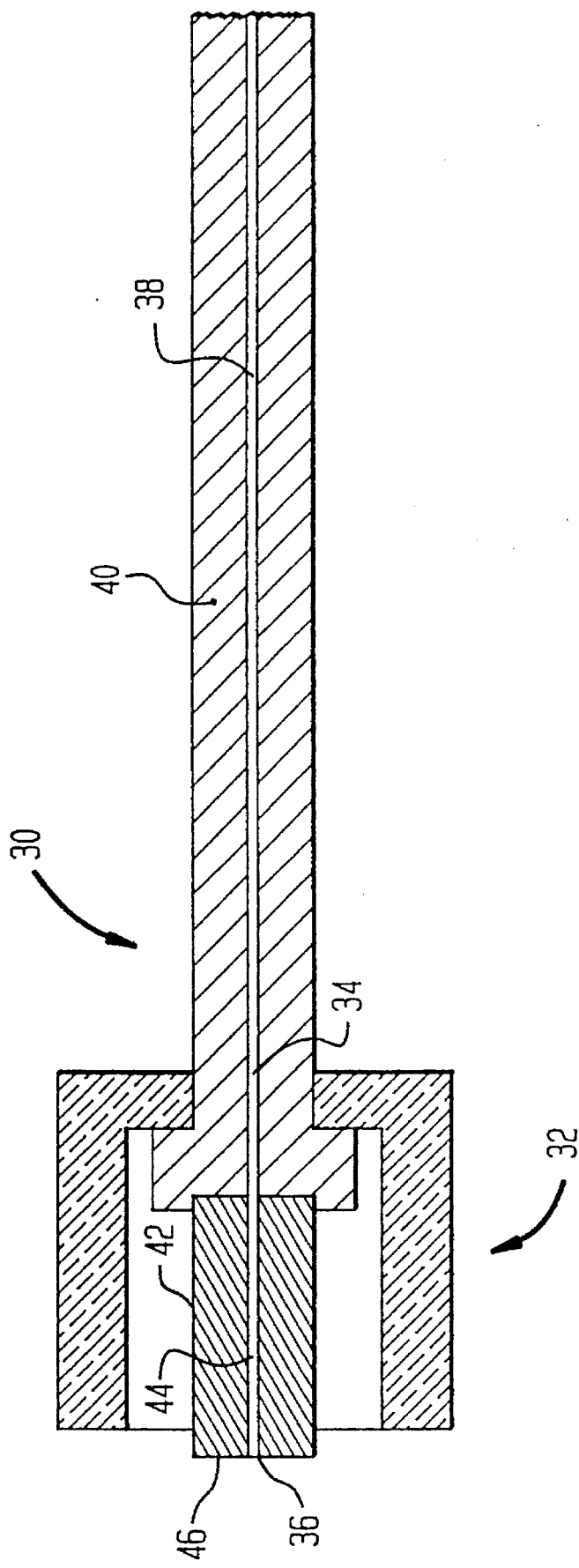
FIG. 3 is an illustrative example of a terminating device utilizing the attenuating waveguide element of the present invention to provide a reflection-less termination.

As will be readily appreciated by those skilled in the art, a wide variety of substantially reflectionless, passive attenuating and terminating devices may be fabricated utilizing the attenuating fiber element of the present invention. For example, an attenuating device suitable for insertion into an existing optical path may be constructed by fusion splicing both ends of a lossy fiber section to respective pigtail sections of fiber having optical properties corresponding to those of the fiber comprising the existing optical path. These pigtails may then be fusion spliced or otherwise coupled to the corresponding ends of the optical fiber at the insertion site. A substantially reflection-less terminating device constructed in accordance with the present invention may include, for example, a section of lossy fiber fusion spliced to an unused fiber. The construction of an alternate terminating device utilizing a coupling assembly is depicted in FIG. 3.

Illustratively, the terminating device 30 incorporates a bayonet type slotted coupling ring 32 which connects by means of a connector receptacle to a suitable bayonet connector (not shown) associated with an unused or other fiber to be terminated. The terminator 30 comprises a length of fiber 34 having a transition metal doped core in accordance with the embodiment depicted in FIG. 1. As will be readily appreciated by those skilled in the art, the degree of transition metal doping of fiber length 34 may be selected such that substantially all optical radiation propagating therein is absorbed.

The fiber length 34 has a front portion 36 and a rear portion 38. The front portion 36 of the fiber length 34 is attached to the bayonet type connector plug designated 32. The rear portion 38 of the fiber length 34 is received in a housing 40 which supports a ceramic ferrule 42 having a bore 44 in which the front fiber portion 36 is inserted. Illustratively, the tip 46 of the ferrule is polished for physical contact with a similar ferrule (not shown) comprising part of the opposing bayonet connector (not shown) associated with the free end of an unused fiber.

It will, of course, be understood that any suitable device may be utilized for coupling an attenuating optical fiber element constructed in accordance with the present invention to one or more fiber ends and that the specific type of coupling selected will generally depend upon the application involved. Thus, while there have been shown and described and pointed out fundamental novel features of the invention as applied to generally preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A passive optical attenuating device, comprising:
   a single mode optical waveguide having a core and cladding and defining an absorbing region adapted to receive optical radiation and to absorb at least 0.2 dB/m of said received optical radiation, said radiation being absorbed along the length of said waveguide to provide attenuation which remains substantially constant below a predetermined optical power.

2. The attenuating device according to claim 1, wherein said absorbing region has a length and is adapted to absorb said optical radiation in a substantially uniform manner along its length.

3. The attenuating device according to claim 1, wherein said absorbing region is operable to absorb between approximately 0.2 to 1000 dB/m of said received optical radiation.

4. The attenuating device according to claim 3, wherein said absorbing region is operable to absorb greater than 100 dB/m of said received optical radiation.

5. The attenuating device according to claim 1, wherein said waveguide comprises a fused silica fiber, said absorbing region comprising a portion of said fiber doped with ions of a metal selected from the class consisting of Fe, Ni, Co, Cr, Cu, Mn, Ti, and V, in a concentration effective to provide a predetermined degree of absorption at a given wavelength.

6. The attenuating device of claim 5, wherein said doped portion is the core of said fiber.

7. The attenuating device of claim 5, wherein said doped portion is a ring layer surrounding the core of said fiber.

8. The attenuating device according to claim 1, further including means for coupling the waveguide to a low-loss optical fiber so as to permit said waveguide to receive an optical signal from the optical fiber.

9. The attenuating device according to claim 8, wherein said coupling means includes at least one pigtail having optical properties corresponding to the low loss fiber, said pigtail being fusion spliced to said waveguide.

10. The attenuating device according to claim 1, wherein said absorbing region is formed by reacting gaseous hydrogen with a dopant in a fused silica fiber.

11. The attenuating device according to claim 1, wherein said absorbing region is formed by gamma radiating a fused silica fiber.

12. The attenuating device according to claim 1, wherein said attenuation remains substantially constant at optical powers of less than 100 mW.

13. A passive optical attenuating device for reducing the power of an optical signal carried by a low-loss single mode optical fiber, comprising:

a section of attenuating single mode fiber connectable to the low-loss single mode optical fiber, said section having a higher absorptivity per unit length than the low-loss single mode optical fiber; and means for coupling said fiber section to the low-loss single mode optical fiber so as to permit said fiber section to receive an optical signal from the low-loss single mode optical fiber.

14. The optical attenuating device according to claim 13, wherein said fiber section has a core and includes at least one region doped with a transition metal.

15. The optical attenuating device according to claim 14, wherein said at least one region is the core.

16. The optical attenuating device according to claim 14, wherein said at least one region is a ring layer surrounding the core.

17. The optical attenuating device according to claim 13, wherein said fiber section is adapted to absorb substantially all optical radiation carried by said low-loss fiber.

18. A method of fabricating an optical signal transmission system having at least one single mode optical waveguide for defining an optical signal transmission path, comprising:

providing a single mode optical waveguide section having a core and cladding and defining an absorbing region adapted to receive optical radiation and to absorb at least 0.2 dB/m of said received optical radiation, the radiation being absorbed along the length of said waveguide section to provide attenuation which remains substantially constant below a predetermined optical power;

coupling a first end of said optical waveguide section to a corresponding termination of the at least one optical waveguide.

19. The method according to claim 18, wherein the optical signal transmission path is defined by first and second one optical waveguides and wherein said coupling step includes coupling each end of said optical waveguide section to a corresponding end of the first and second optical waveguides.

20. The method according to claim 18, wherein the at least one optical waveguide and said optical waveguide section are optical fibers, said coupling step comprising fusion bonding said optical fibers together.

21. The optical attenuating device according to claim 13, wherein said attenuating fiber section absorbs at least 0.2 dB/m of the optical signal received.

\* \* \* \* \*